(12) United States Patent
Pearce et al.

(10) Patent No.: US 8,315,486 B2
(45) Date of Patent: Nov. 20, 2012

(54) DISTRIBUTED ACOUSTIC SENSING WITH FIBER BRAGG GRATINGS

(75) Inventors: Jeremiah Glen Pearce, Houston, TX (US); Frederick Henry Kreisler Rambow, Houston, TX (US); Dennis Edward Dria, Houston, TX (US)

(73) Assignee: Shell Oil Company, Houston, TX (US)

( * ) Notice: Subject to any disclaimer, the term of this patent is extended or adjusted under 35 U.S.C. 154(b) by 401 days.

(21) Appl. No.: 12/580,130

(22) Filed: Oct. 15, 2009

(65) Prior Publication Data
US 2010/0200744 A1    Aug. 12, 2010

Related U.S. Application Data

(60) Provisional application No. 61/150,842, filed on Feb. 9, 2009.

(51) Int. Cl.
*G02B 6/00* (2006.01)
(52) U.S. Cl. .............. 385/13; 250/268; 359/285
(58) Field of Classification Search ............ 385/13; 250/268; 359/32, 285–287
See application file for complete search history.

(56) References Cited

U.S. PATENT DOCUMENTS

| | | | | |
|---|---|---|---|---|
| 5,007,705 A |   | 4/1991 | Morey et al. ............... | 350/96.29 |
| 6,072,567 A | * | 6/2000 | Sapack ........................ | 356/32 |
| 6,913,079 B2 | * | 7/2005 | Tubel ......................... | 166/250.01 |
| 7,369,716 B2 | * | 5/2008 | Berg et al. ................... | 385/12 |
| 7,729,035 B2 | * | 6/2010 | Kim ............................ | 359/287 |
| 2004/0033017 A1 |   | 2/2004 | Kringlebotn et al. ........... | 385/31 |
| 2004/0083808 A1 |   | 5/2004 | Rambow et al. ............... | 73/250 |
| 2004/0202400 A1 |   | 10/2004 | Kochergin et al. ............ | 385/12 |
| 2005/0007705 A1 |   | 1/2005 | Dobisz et al. ................ | 360/324.1 |
| 2006/0115335 A1 |   | 6/2006 | Allen et al. .................. | 405/274 |
| 2006/0233482 A1 |   | 10/2006 | Rambow ....................... | 385/12 |
| 2007/0036492 A1 | * | 2/2007 | Lee ............................. | 385/89 |
| 2008/0204859 A1 | * | 8/2008 | Shu et al. .................... | 359/337.5 |
| 2009/0114386 A1 |   | 5/2009 | Hartog et al. ................ | 166/250.08 |
| 2010/0087732 A1 | * | 4/2010 | Eberle et al. ................. | 600/437 |
| 2010/0254650 A1 |   | 10/2010 | Rambow ........................ | 385/13 |
| 2011/0030467 A1 | * | 2/2011 | Bakulin ........................ | 73/152.32 |
| 2011/0048136 A1 |   | 3/2011 | Birch et al. .................. | 73/705 |
| 2011/0054808 A1 |   | 3/2011 | Pearce et al. ................. | 702/42 |
| 2011/0185807 A1 |   | 8/2011 | Albrecht et al. ............... | 73/152.57 |

FOREIGN PATENT DOCUMENTS
WO    WO2011017415    2/2011

* cited by examiner

*Primary Examiner* — Ellen Kim

(57) ABSTRACT

A method for obtaining information about a subsurface formation from acoustic signals that contain information about to the subsurface formation, comprises: providing a fiber optic having a proximal end and a remote end, with the proximal end being coupled to a light source and a proximal photodetector, wherein said fiber optic cable includes randomly spaced impurities and selectively placed Bragg gratings and wherein the fiber optic cable is acoustically coupled to the subsurface formation so as to allow the acoustic signals to affect the physical status of at least one grating: transmitting at least one light pulse into the cable; receiving at the photodetector a first light signal indicative of the physical status of at least one first section of the cable, and outputting at least one item of information to a display.

8 Claims, 3 Drawing Sheets

DISTRIBUTED ACOUSTIC SENSING WITH FIBER BRAGG GRATINGS

RELATED CASES

This case claims priority to U.S. provisional application 61/150,842, filed Feb. 9, 2009 and entitled "Method Of Detecting Fluid In-Flows Downhole," which is incorporated herein by reference.

FIELD OF THE INVENTION

The invention relates to a method of increasing the spatial resolution of an optical sensing system by including fiber Bragg gratings in portions of the optical fiber.

BACKGROUND OF THE INVENTION

Seismic surveys are useful for studying subsurface formations in many contexts, including the monitoring of subsurface hydrocarbon reservoirs and the tracking of fluids, e.g. oil, gas, or water, as they flow through the subsurface strata. One type of areal monitoring that is gaining in importance is the ability to track $CO_2$ that has been injected as part of carbon capture and sequestration (CCS) projects. Also of interest in the context of subsurface monitoring are the various fluids that are used for enhanced oil recovery (EOR), hydrocarbon saturation, fraccing operations, and the like.

Conventional seismic monitoring is typically multi-dimensional, with three dimensions relating to the spatial characteristics of the earth formation. Typically two dimensions are horizontal length dimensions, while the third relates to depth in the earth formation, which can be represented by a length coordinate, or by a time coordinate such as the two-way travel time of a seismic wave from surface to a certain depth and back. In addition, seismic data are often also acquired for at least two points in time, providing a fourth dimension. This allows changes in the seismic properties of the subsurface to be studied as a function of time. Changes in the seismic properties over time may be due to, for example, spatial and temporal variation in fluid saturation, pressure and temperature.

Seismic monitoring techniques investigate subsurface formations by generating seismic waves in the earth and measuring the time the waves need to travel between one or more seismic sources and one or more seismic receivers. The travel time of a seismic wave is dependent on the length of the path traversed, and the velocity of the wave along the path.

A typical system includes several acoustic receivers deployed across the region of interest. It is not uncommon to use hundreds or even thousands of acoustic sensors to collect data across a desired area, as illustrated in FIG. 1. In instances where the sensors are placed in a borehole, fewer sensors are used, and the information available is correspondingly limited.

Seismic data-containing acoustic signals recorded by the seismic sensors are known as traces. The recorded traces are analyzed to derive an indication of the geology in the subsurface or other information. In order to maximize repeatability, the sensors are ideally left in place for the duration of the monitoring period.

Conventional seismic monitoring of oil or gas fields has several disadvantages. First, it is relatively expensive to acquire, deploy and maintain the large numbers of geophones or hydrophones that are needed in order to provide the desired level of resolution for the time periods that are typically involved, which may be on the order of years.

Second, the resolution of conventional systems is limited by the number and placement of the acoustic receivers. Some acoustic systems exist in which acoustic events are detected by monitoring changes in light backscattered in a fiber optic cable that is physically affected by the acoustic event. These systems are referred to as Distributed Acoustic Sensing (DAS) systems and operate using principles similar to Optical Time-Domain Reflectometry (OTDR). In OTDR, a fiber-optic cable is probed with a laser pulse from an interrogation unit. Defects in the glass backscatter the pulse (Rayleigh scattering) as it propagates along the fiber and the backscattered photons are received in a photodetector. The data is used to map the reflectivity of the fiber along its length. DAS uses a similar technique, in which external acoustic disturbances modulate the backscattered light from certain sections of the fiber. By recording these traces at high data rates (~5 kHz), DAS transforms the fiber into a large number of distributed microphones or sensors.

These systems avoid the need for distinct acoustic sensors such as geophones or hydrophones, but depend on impurities in the optical cable to cause backscattering. Because sensitivity depends on impurities, the backscattered signal may be weak or non-existent in portions of the cable where it is desired to sense. Current DAS systems provide spatial resolution on the order of 1-10 m. This insufficient in many situations, including in-flow monitoring applications, where relevant events could be very localized (<1 m). The source of this limitation is due to the tradeoff between the length of the pulse (or spatial resolution) and measurement sensitivity. A longer laser pulse would provide a higher number of backscattered photons, but from a larger section of the fiber.

For these reasons, it is desirable to provide an areal seismic monitoring system that is inexpensive to acquire, deploy, and maintain, and which can provide high resolution with respect to the region of interest. The region of interest may include a part of the subsurface that is important to the production of hydrocarbons or because it is undergoing change in acoustic properties as compared to other regions or because it requires different seismic sampling spacing (spatial or temporal) in contrast with other regions.

SUMMARY OF THE INVENTION

The present invention provides an areal seismic monitoring system that is inexpensive to acquire, deploy, and maintain, and which can provide high resolution with respect to the region of interest.

In some embodiments, the invention provides a method for obtaining information about a subsurface formation from acoustic signals that contain information about to the subsurface formation, comprising a) providing at least one fiber optic cable deployed within acoustic range of the subsurface formation, the fiber optic cable having a proximal end and a remote end, the proximal end being coupled to a light source and to a proximal photodetector, wherein the fiber optic cable includes randomly spaced impurities and a plurality of selectively placed fiber Bragg gratings and wherein the fiber optic cable is acoustically coupled to the subsurface formation so as to allow the acoustic signals to affect the physical status of at least one grating, b) transmitting into the cable at least one light pulse, c) receiving at the photodetector a first light signal indicative of the physical status of at least one first section of the cable, d) optionally, further processing the first and second items of information so as to produce derivative information; and e) outputting at least one of the first item of information and the derivative information to a display.

Step a) may include selecting the location of the Bragg gratings using preexisting information about the subsurface formation.

The method cable may includes a proximal section that is free of Bragg gratings and a distal section that includes the plurality of Bragg gratings and the proximal section is 10 times longer than the distal section.

At least a portion of the cable that includes at least one of the fiber Bragg gratings may be affixed to equipment placed in a borehole and the cable may be used to sense at least two aspects selected from the group consisting of acoustic events within or outside of the borehole, fluid flow into the borehole, deformation or corrosion of tubing or casing in the borehole, pressure changes in the borehole, and/or changes in the strain state of the formation surrounding the borehole. The at least two aspects are preferably sensed without modification or intervention of the cable.

A portion of the cable is wrapped around a tubular in a well or may include loops or curves that increase the sensitivity of the cable to strain.

BRIEF DESCRIPTION OF THE DRAWINGS

For a more detailed understanding of the invention, reference is made to the accompanying drawings wherein.

As used herein, the term "area" refers an amount of the surface that is sensed by a cable or section of cable, with the boundaries of the area being established by an imaginary line parallel to the surface and drawn so as to enclose that cable or section of cable.

As used herein the term "cable" refers generally to optical fiber, fiber optic cable, or any other device that is capable of transmitting optical signals, with or without coatings or other features.

DETAILED DESCRIPTION OF A PREFERRED EMBODIMENT

Figure 1:
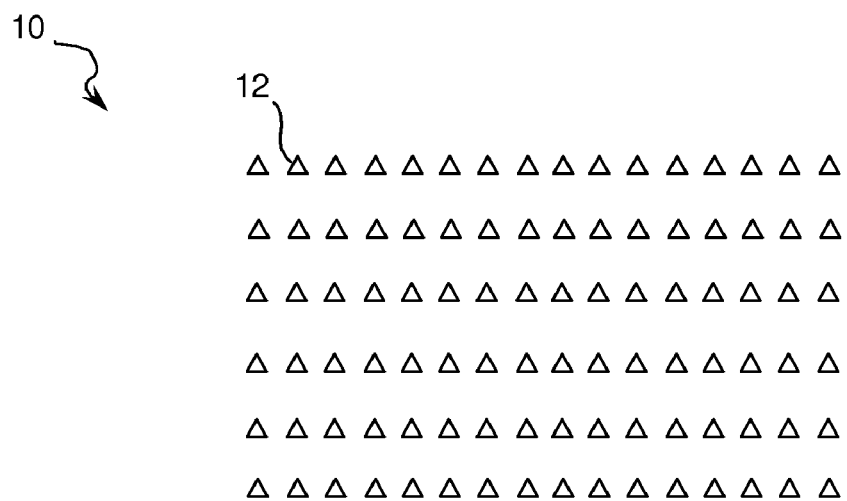
FIG. 1 is a schematic illustration of a prior art system.

Referring initially to FIG. 1, an array 10 of conventional acoustic sensors 12 may be deployed as shown. The number of sensors available to cover the desired area is typically limited by cost; once the number of available sensors is established, the sensors are deployed. For on-shore applications, the sensors may be deployed manually, such as by using a GPS system to place each sensor in a desired location, or they may be installed at the bottom of purposely drilled shallow boreholes. For offshore applications, the sensors, referred to as Ocean Bottom Seismometers (OBS) may be deployed by remotely operated vehicle (ROV) and placed on the seabed at desired locations, or they may be deployed in cabled configurations with fixed inter-sensor spacings in via Ocean Bottom Cables (OBC) laid on the seabed.

Regardless of the mode or manner of deployment, it is frequently desired to acquire data having more resolution than is available. Without additional sensors, it is impossible to collect such data.

The present invention provides the ability to collect data in a manner that allows for much higher resolution. In addition, the present system has the ability to be both adaptable and/or programmable. According to preferred embodiments of the present invention, a fiber optic cable is connected to a light transmission source disposed at a proximal end of the cable. The light source transmits at least one light pulse into the end of the fiber optic cable. The cable may be double-ended, i.e. may be bent in the middle so that both ends of the cable are at the source, or it may be single-ended, with one end at the source and the other end at a point that is remote from the source. The length of the cable can range from a few meters to several kilometers, or even hundreds of kilometers. In either case, measurements can be based solely on backscattered light, if there is a light-receiving means only at the source end of the cable, or a light receiving means can be provided at the second end of the cable, so that the intensity of light at the second end of the fiber optic cable can also be measured.

Figure 2:
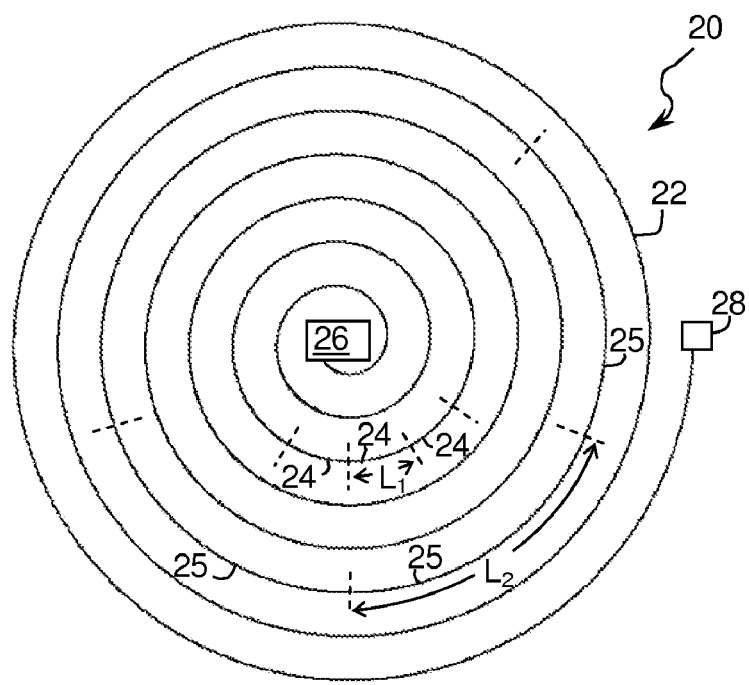
FIG. 2 is a schematic illustration of a system constructed in accordance with a first embodiment of the invention.

In some embodiments, a single long cable is deployed over the area to be monitored. In other embodiments, a cable can be deployed in a well. One embodiment of a DAS system 20 is shown in FIG. 2 and includes a single fiber optic cable 22 deployed in a spiral. Cable 22 is preferably a strand of single-mode optical fiber connected to a signal processing center 26. Signal processing center 26 includes a light source (not shown) arranged to introduce an optical signal into an input end of cable 22 and a proximal photodetector (not shown) arranged to detect radiation that has been reflected or backscattered within cable 22 back toward the input end and to generate an output signal in response to the detected radiation.

Fiber with FBGs tends to have greater losses and therefore more backscatter than fiber without FBGs. Thus, sections of fiber that contain FBGs produce higher amplitude signals and do not require such a long laser pulse, thereby improving the spatial resolution. This is particularly applicable to in-well applications, where acoustic surveillance is only needed on a small portion of the well that requires a long lead-in cable (>10,000 ft).

In one embodiment of the invention, Fiber Bragg Gratings (FBGs) are included in portions of the fiber that are located near sections of the environment that are of particular interest. For example, if the fiber were deployed in a well, FBGs would preferably be included in portions of the fiber that passed through producing zones. The locations of producing zones may be determined using preexisting data, such as from wireline logging or the like.

Figure 6:
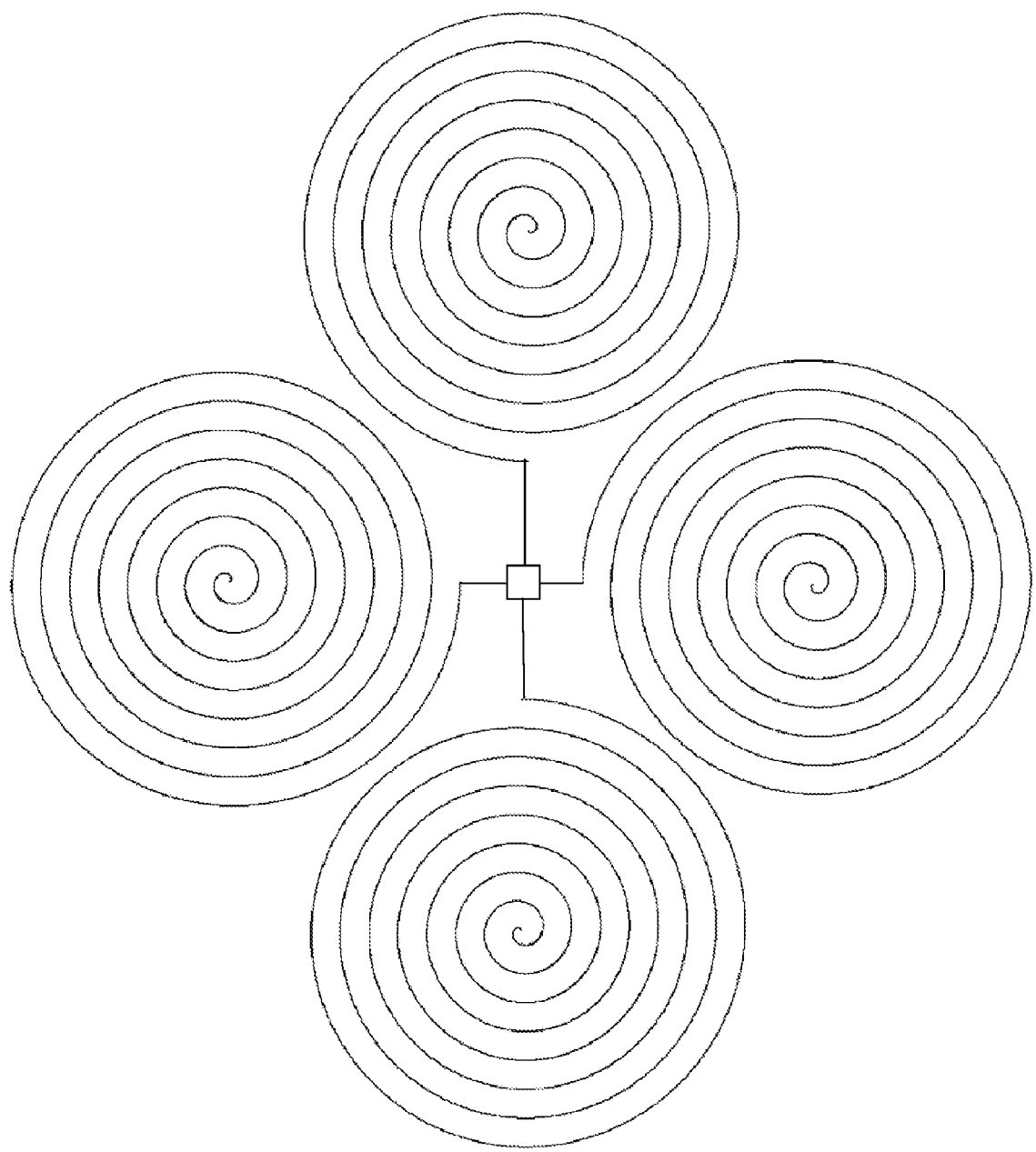
FIG. 6 is a schematic illustration of a system constructed in accordance with a second embodiment of the invention, As used herein, the term "surface" refers to the earth's surface and in marine applications to the seafloor. Items "at the surface" are acoustically coupled to the earth by direct or indirect physical contact with the surface, such as by being laid on the surface or by being placed in shallow trenches, as opposed to being placed beneath the surface, such as in a borehole.

As illustrated, if applied at the surface, cable 22 can be arranged so that it extends radially outwardly from signal processing center 26 in a spiral, but it will be understood that one or more cables can be arranged in any other suitable arrangement, such as the multi-spiral configuration shown in FIG. 6, a grid, or any other suitable configuration.

In other embodiments cable 22 can be deployed in one or more boreholes. In some embodiments, the cable may be provided in conjunction with around downhole equipment. By way of example only, fiber optic cable may be lowered into an existing well and be unrestrained in the wellbore, where it is typically surrounded by liquid. In other embodiments, the fiber optic cable can be clamped to the inside or outside of casing or production or injection tubing at intervals, or affixed along its length by means of a suitable adhesive or the like. In still other embodiments, the fiber optic cable can be positioned on the outside of the casing so that it is acoustically coupled to the formation via the cement in the annulus.

In still other embodiments, fiber optic cable can be included in various downhole tools and well-completion components, such as sand screens, slotted or perforated liners, other sand-control components and telescoping joints, or included in other tools typically used for well intervention such as coiled tubing, composite hollow or solid tubes, braided cable, communication cables for conveying logging tools or slick-line cables, or included in such or similar devices which are conveyed into the existing well specifically for the purpose of obtaining the acoustic information needed. In each case, the requisite degree of acoustic coupling may depend on the nature and completion state of each well and the nature of the acoustic source and signals.

In still other embodiments, cable 22 or at least the portion of cable 22 that contains some of the fiber Bragg sensors is placed in a well in a manner that allows it to deform on the scale that can measure large displacements and strains in the well. Preferably, reflection amplitude and frequency response change predictably in response to such inputs. In these embodiments, cable 22, or a portion thereof, is configured into one or more "snake" shaped sensors, "loop" shaped sensors, and/or "helical" sensors with bent fiber Bragg gratings essentially positioned in the bends of these sensors, all preferably enclosed in a protective sheath, in a manner whereby response changes caused by displacement forces correspond with and are indicative of the desired information, such as seismic events. In the case of "snake" or "S" shaped sensors, further compression of said structure from acoustic events results in increases in said bandwidth that can be predicted and calibrated to provide data. In the case of "loop" shaped sensors, an increase in compression will result in a decrease in bend and a decrease in bandwidth.

In still other embodiments, cable 22 or at least the portion of cable 22 that contains some of the fiber Bragg sensors can be incorporated into a structure to be monitored; the sensors then provide seismic monitoring. Once the system is in place in a well, the system may be either continuously monitored or monitored periodically without entering the well or altering the well in any way. The fiber gauges are highly reliable and should easily last the life of a well. Examples of such systems are discussed in U.S. Pat. No. 6,854,327.

Cable 22, or at least the portion of cable 22 that contains Bragg gratings, is preferably acoustically coupled to the subsurface formation, so that acoustic signals travelling from the region of interest can affect the physical status of the cable. By altering the physical status of the cable, the acoustic signals create a localized or semi-localized change in the backscattering properties of the cable, which in turn can be sensed by a photodetector. Using techniques that are known in the art, the optical signals received from the cable can be used to extract information about the position and magnitude of the incoming acoustic signal(s).

In some embodiments, the light source is a long coherence length phase-stable laser and is used to transmit direct sequence spread spectrum encoded light down the fiber. Acoustic vibrations or other disruptions cause small changes to the fiber, which in turn produce changes in the backscattered light signal. The returning light signal thus contains both information about the acoustic vibration and location information indicative of where along the fiber sound impacted the fiber. The location of the acoustic signal along the fiber can be determined using the spread spectrum encoding, which uniquely encodes the time of flight along the length of the fiber.

Using optical time domain reflectometry (OTDR) technology, it is possible to determine an amount of backscattered light arriving from any point along fiber optic cable 22. Although the duration of the light pulse determines the lower limit on the spatial resolution, the resulting signal can be used to extract information at any larger interval. This can be accomplished by dividing the backscattered light signal into a series of bins in time. The data within each bin is summed to give information about the average strain on the length of fiber between the endpoints of the bin. These bins can be made arbitrarily large to sample longer sections of the fiber. The bins may be equally sized and continuously spread over the entire length of the fiber with the end of one bin becoming the start of the next, but if desired, the size and position of each bin, in addition to the spacing between consecutive bins, can be tailored to yield the optimum desired spatial sampling resolution. This programmably distributed sensing allows maximum resolution sampling along intervals of high interest without over-sampling regions of lower interest.

Thus, by time-gating the received backscattered signal, cable 22 can be treated as a plurality of discrete acoustic "sensors," with each sensor corresponding to a section of cable. The time-gating can be controlled to produce sections/sensors that are as long or as short as desired. Referring again to FIG. 2, for example, one portion of cable 22 can sense at high resolution, using relatively short sections of cable having lengths $L_1$, as shown at 24, while another portion of cable 22 can sense at a lower resolution, using relatively long sections of cable having lengths $L_2$, as shown at 25. In some embodiments, higher-resolution section length $L_1$ is preferably 0.5 to 10 m and lower-resolution section length $L_2$ is preferably 10 to 1000+m.

One example of a suitable technology is a system called Blue Rose. This system exploits the physical phenomenon of Rayleigh optical scattering, which occurs naturally in optical fibers used traditionally for optical time domain reflectometry (OTDR) techniques. Blue Rose detects backscattered light and uses the signal to give information about acoustic events caused by activities near the cable. The sensor is a single strand of single-mode optical fiber with an elastomeric coating that is buried in the ground at a depth of approximately nine inches. Alternatively, coherent OTDR (C-OTDR) processes can be used to obtain similar acoustic information from an optical system, as disclosed in U.S. Application No. 20090114386.

Still further, the present system can be used in conjunction with wavelength division multiplexing and/or frequency division multiplexing. Since fiber Bragg gratings can be formed so as to be more reflective at a particular wavelength, it may be desirable in some cases to provide differently-tuned gratings along the length of the fiber, so as to increase the sensitivity in desired sections.

Because the present invention combines the adaptability of distributed acoustic sensing with the precision and predictability of fiber Bragg gratings, it provides a single system that can be used for seismic surveying or monitoring, well monitoring, tubular monitoring and formation monitoring. A single cable 22, properly placed in a well, can sense internal or external acoustic events, in-flow, tubing or casing deformation or corrosion, pressure changes, and/or changes in the strain state of the formation. Moreover, the system can switch from one type of measurement to another without modification or intervention.

Fiber optic cable 22 can be deployed on or near the earth's surface or beneath the surface, such as in a borehole. Using the approach described above, cable 22 can be used to sense acoustic signals (vibrations) from naturally occurring events, induced subsurface events, or active seismic sources at or beneath the surface. One example of a subsurface acoustic event is a fluid in-flow, where fluid from the formation, either gas or liquid, flows into the borehole. Depending on the well and location in the well, such in-flows may be desirable or undesirable. Regardless, a system that can detect and locate such in-flows would be advantageous. In addition, data collected from the present system can be processed to simulate data from "virtual sources," as is known in the art, or the system can be used to record signals from virtual sources.

Still referring to FIG. 2, cable 22 may have an optional second photodetector 28 disposed at its remote end. Remote photodetector 28 preferably communicates with the signal processing center 26 via wireless signal or other suitable means. If present, remote photodetector 28 will receive light that has been transmitted along the length of the cable. The level or intensity of light received by remote photodetector 28 can be compared to a base level, where the base level is preferably the intensity that is received at remote photodetector 28 when the system is in normal operation with no disturbance to the fiber optic cable 22.

In one embodiment, signal processing center 26 continuously samples the amount of backscattered light at each section along the fiber optic cable 22 and compares the backscattered light intensity with a previous sample to determine whether a sufficient change in backscattered light intensity has occurred and if so, at which point(s). This approach is useful for detecting disturbances to the fiber, but can generate volumes of data that are impractical to handle, particularly if the sections are relatively short.

Thus, in another embodiment, sensing and location of backscattered light may be actuated by a detection of a change in light intensity at the remote photodetector 28. Because it allows the storage of smaller volumes of data, this approach may be advantageous in cases where there are limitations on the volume of data that can be collected or processed. It is expected that many acoustic events will last long enough to be sensed by the system post-actuation. If it is desirable to ensure that no early-event data is lost, a continuously refreshing memory buffer can be used to store the backscattered light from fiber optic cable 22, only transferring sets of data to a permanent medium when actuated by detection of a change in light in photodetector 28.

In other embodiments, the system can be programmed to increase the resolution of the sampling when actuated by detection of a change in light in photodetector 28.

In still other embodiments, one or more cable sections can be used as monitoring devices, so that the system modifies its resolution in one or more areas or stores data from a memory buffer in response to a change in signal from one or more of the designated monitoring device sections. Thus, for example, if a very large sensing system is used, it may be desirable to designate a subset of the possible sensing sections as monitoring sections and to alter the sensing density in the vicinity of a particular sensing section in response to a change in the signal received from that section.

The flexibility of each acoustic sensing cable can be leveraged to build an areal seismic recording network with programmable spatial distribution that provides optimal resolution when adapted to focus on regions of interest. Regions of interest may relate to fluid presence, pressure, or temperature fronts as these evolve over time due to production, CCS, EOR, or other processes. In an exemplary embodiment, programmably distributed sensing with finely spaced sensors could be employed in areas where reservoir processes are varying rapidly in a lateral sense, while coarse distributions could be employed elsewhere. The sensor interrogation program and effective sensor distribution pattern can be adapted to follow areas of interest as production evolves through time.

In still other embodiments, it may be desirable to record with two different resolutions when the subsurface includes both shallow and deep objectives.

Figure 3:
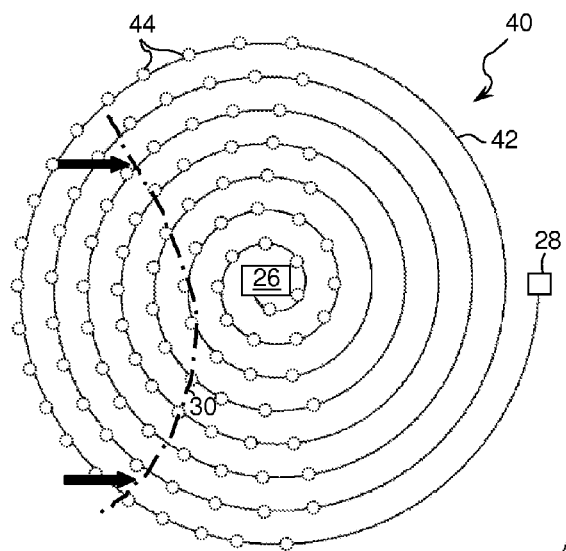
FIGS. 3-5 are schematic illustrations of a system in accordance with invention in use over a time interval.
Figure 4:
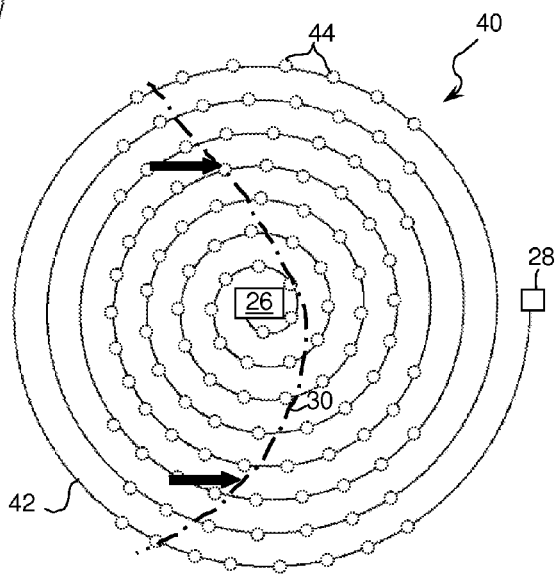
Figure 5:
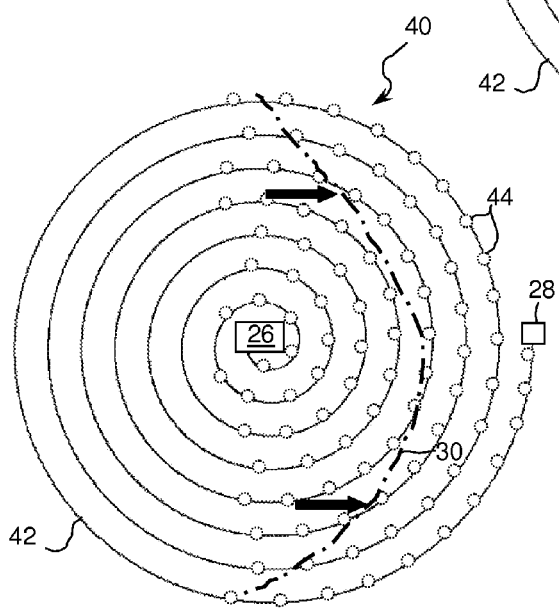

Still further embodiments of the invention lighten the data storage and processing load by sensing only desired portions of the fiber and varying the portions that are sensed. An example of such a system is shown in FIGS. 3-5, in which a system 40 is dynamically monitored to track the movement of a fluid front 30 as it traverses the system from left to right as-drawn, as indicated by the arrows. In sequential FIGS. 3-5, phantom indicators 44 represent sections of cable 42 that are selected for sensing. Once the location of fluid front 30 has been established, sensing can be limited to sections 44 that lie in the vicinity of the front. As the front moves across the sensing area, the selection of sections for sensing also shifts, with some sections ceasing to be interrogated and interrogation of some sections being initiated, so as to maintain a high resolution image of the front without unnecessary data sampling. In this embodiment both the amount (area) of coverage and the location of the sensing may be varied.

In other embodiments, the invention can provide variable time resolution of a sensor network that is distributed in space. In this case, spatial resolution is maximized everywhere in the field but an acceptable time resolution, for example 1 week, is selected and data with high spatial resolution is time-multiplexed to provide information from the entire network at discrete time steps. Both spatial and temporal resolution are preferably independently variable and programmable.

The adaptable sensor network may be disposed in conventional 2D or 3D recording geometries, such as on or near the surface for surface seismic acquisition, near the seabed for ocean bottom marine acquisition, and in the water for marine acquisition. In some environments, it may be sufficient to lay the optical cable on the earth's surface, while in other environments it may be preferable to bury the cable in a shallow trench in order to enhance its acoustic coupling to the earth. The adaptable sensor network may also be installed in vertical, deviated, or horizontal boreholes for downhole seismic acquisition. These boreholes may be dedicated observation wells or production-related wells. Installation of the network is envisioned to be on a permanent basis, to maximize coupling to the formation and to reduce data acquisition costs.

The present adaptable monitoring system can record acoustic signals generated by seismic energy sources that can be placed on the surface, in the water, or in boreholes, or can be passive in nature (microseismic). The monitoring systems that would result from such combination of sources and adaptable sensor networks includes all known geometries, such as 2D or 3D surface seismic, 2D or 3D ocean bottom or marine seismic, 2D or 3D VSP seismic, cross-well seismic, microseismic monitoring in boreholes or at surface from hydraulic fracturing or EOR processes, etc. Likewise, the present system can be used to monitor all propagation modes, including reflection and refraction (shear and compressional) waves, surface waves, Love waves and other guided modes. When the fiber optic cables are deployed downhole in horizontal wells, such configurations enable the use of virtual source seismic techniques, which are useful for reservoir monitoring under complex overburden.

To maximize the benefits of sensor network adaptability, the present system preferably has high along-fiber resolution (e.g. ~1 m for fine spacing and up to 100 m for coarse spacing). For areal monitoring applications, the optical fibers are preferably arranged in patterns such that the sensor network covers the subsurface maximally, for example gridded or spiral patterns on shallow trenches. Spiral-shaped boreholes may also be used.

The adaptability of the present system is also advantageous when the sensing environment is constrained or changes. For example, in systems where it is not possible to place actual sensors in all desired locations, because of physical obstacles or the like, the present system can be programmed to adapt to the lack of sensor presence by providing increased sampling density at points adjacent to the obstacle. Data from these points can be processed to give information about the obstructed area.

In other embodiments, a system such as that described in U.S. Application No. 2008277568 can be used. That system uses pulsed pairs of light signals that have different frequencies and are separated in time. If used, such a system allows processing of the signal to be carried out more easily and with a greater signal-to noise ratio than is the case if radiation of a single frequency backscattered from different positions along the length of optical fiber is used to generate a signal at a photodetector by interferometery.

While the present invention has been described in terms of the preferred embodiments, it will be understood that various modifications thereto can be made without departing from the scope of the invention, as set out in the claims that follow. By way of example only, one of skill in the art will recognize that the number and configuration of cables and sensors, the sampling rate and frequencies of light used, and the nature of the cable, coupling devices, light sources and photodetectors can all be modified.

What is claimed is:

1. A method for obtaining information about a subsurface formation from acoustic signals that contain information about to the subsurface formation, comprising:
   a) providing at least one fiber optic cable deployed within acoustic range of the subsurface formation, said fiber optic cable having a proximal end and a remote end, said proximal end being coupled to a light source and to a proximal photodetector, wherein said fiber optic cable includes randomly spaced impurities and a plurality of selectively placed fiber Bragg gratings, wherein said fiber optic cable is acoustically coupled to the subsurface formation so as to allow the acoustic signals to affect the physical status of at least one grating, wherein at least a portion of the cable that includes at least one of the fiber Bragg gratings is affixed to equipment placed in a borehole and the placement of the Bragg gratings is selected using preexisting information about the subsurface formation;
   b) transmitting into the fiber optic cable at least one light pulse;
   c) receiving at the photodetector a first light signal indicative of at least two aspects selected from the group consisting of acoustic events within or outside of the borehole, fluid flow into the borehole, deformation or corrosion of tubing or casing in the borehole, pressure changes in the borehole, and/or changes in the strain state of the formation surrounding the borehole at at least one first section of the fiber optic cable,
   d) optionally, repeating steps a)-c) so as to collect a second light signal indicative of the physical status of a section of the fiber optic cable and further processing the first and second light signals so as to produce derivative information; and
   e) outputting at least one of a light signal and the derivative information to a display.

2. The method according to claim 1 wherein the cable includes a proximal section that is free of Bragg gratings and a distal section that includes the plurality of Bragg gratings and the proximal section is 10 times longer than the distal section.

3. The method according to claim 1 wherein the at least two aspects are sensed without modification or intervention of the cable.

4. The method according to claim 1 wherein at least a portion of the cable is wrapped around a tubular in a well.

5. The method according to claim 1 wherein at least a portion of the cable includes loops or curves that increase the sensitivity of the cable to strain.

6. A method for obtaining information about a subsurface formation from acoustic signals that contain information about to the subsurface formation, comprising:
   a) providing at least one fiber optic cable deployed within acoustic range of the subsurface formation, said fiber optic cable having a proximal end and a remote end, said proximal end being coupled to a light source and to a proximal photodetector, wherein said fiber optic cable includes randomly spaced impurities and a plurality of selectively placed fiber Bragg gratings and wherein said fiber optic cable is acoustically coupled to the subsurface formation so as to allow the acoustic signals to affect the physical status of at least one grating, wherein the location of the Bragg gratings is selected using preexisting information about the subsurface formation, wherein the cable includes a proximal section that is free of Bragg gratings and a distal section that includes the plurality of Bragg gratings and the proximal section is 10 times longer than the distal section;
   b) affixing at least a portion of the fiber optic cable that includes at least one of the fiber Bragg gratings to equipment placed in a borehole;
   b) transmitting into the fiber optic cable at least one light pulse;
   c) receiving at the photodetector a first light signal indicative of the physical status of at least one first section of the fiber optic cable,
   d) optionally, repeating steps a)-c) so as to collect a second light signal indicative of the physical status of a second section of the fiber optic cable and further processing the first and second light signals so as to produce derivative information; and
   e) outputting at least one of said signals and the derivative information to a display;
   wherein the cable is used to sense at least two aspects selected from the group consisting of acoustic events within or outside of the borehole, fluid flow into the borehole, deformation or corrosion of tubing or casing in the borehole, pressure changes in the borehole, and/or changes in the strain state of the formation surrounding the borehole.

7. The method according to claim 6 wherein the at least two aspects are sensed without modification or intervention of the cable.

8. The method according to claim 6 wherein at least a portion of the cable is wrapped around a tubular in a well.

* * * * *